J. H. & L. F. ROBINSON.
COMBINED PLANTER AND FERTILIZER DISTRIBUTER.
APPLICATION FILED SEPT. 7, 1911.
1,019,189.
Patented Mar. 5, 1912.
4 SHEETS—SHEET 2.
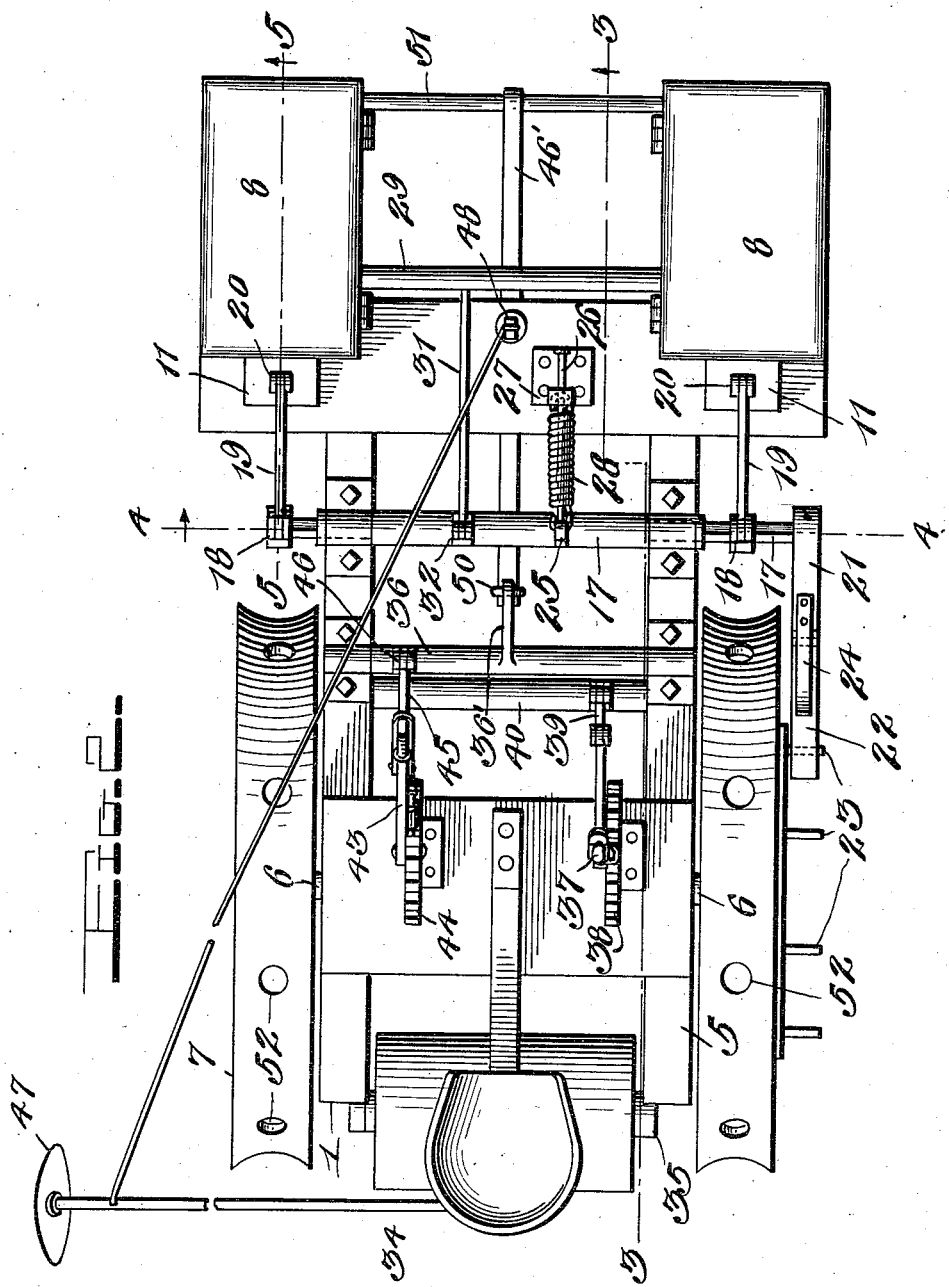
Witnesses
Chas. L. Griesbauer.
G. B. Norton.
Inventors
J. H. Robinson and
L. F. Robinson,
By Watson E. Coleman,
Attorney

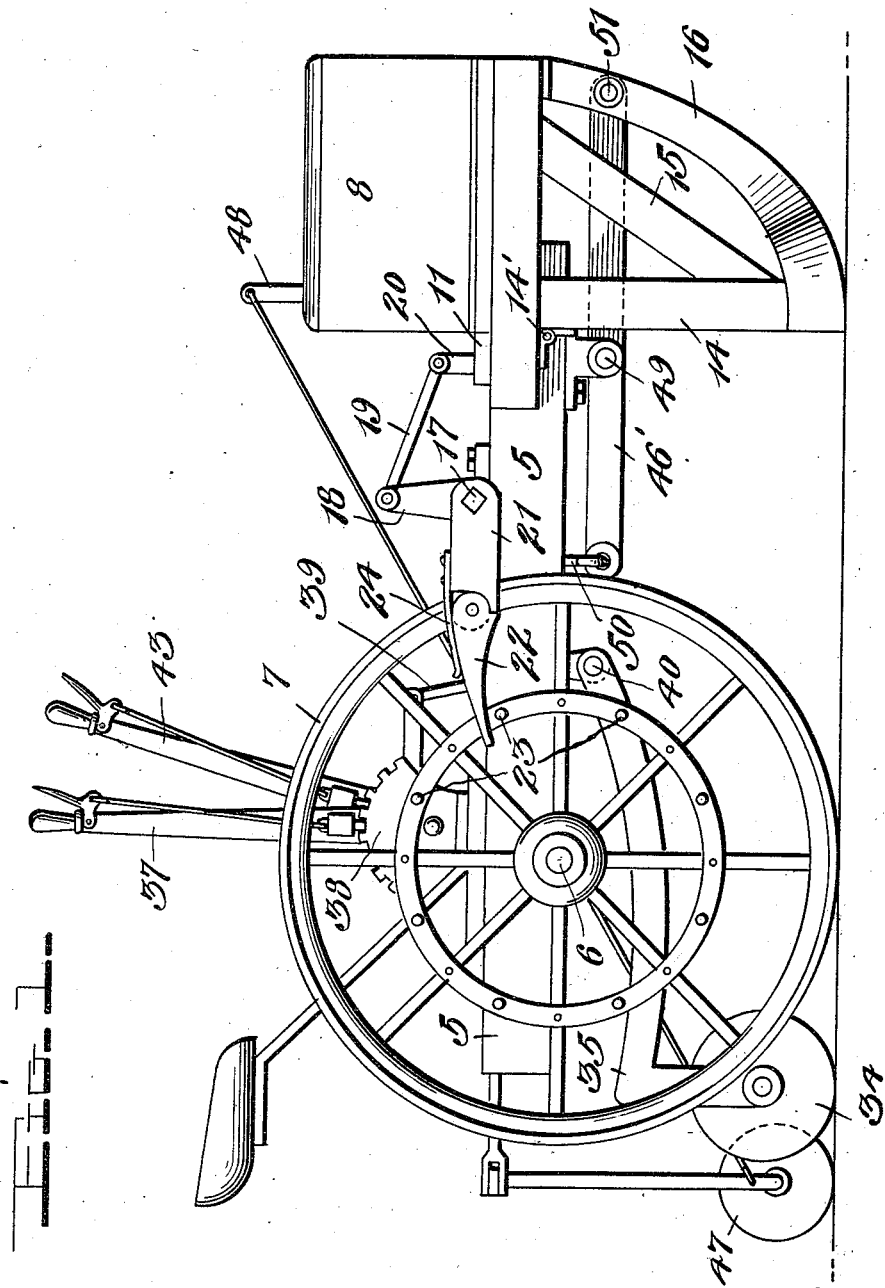

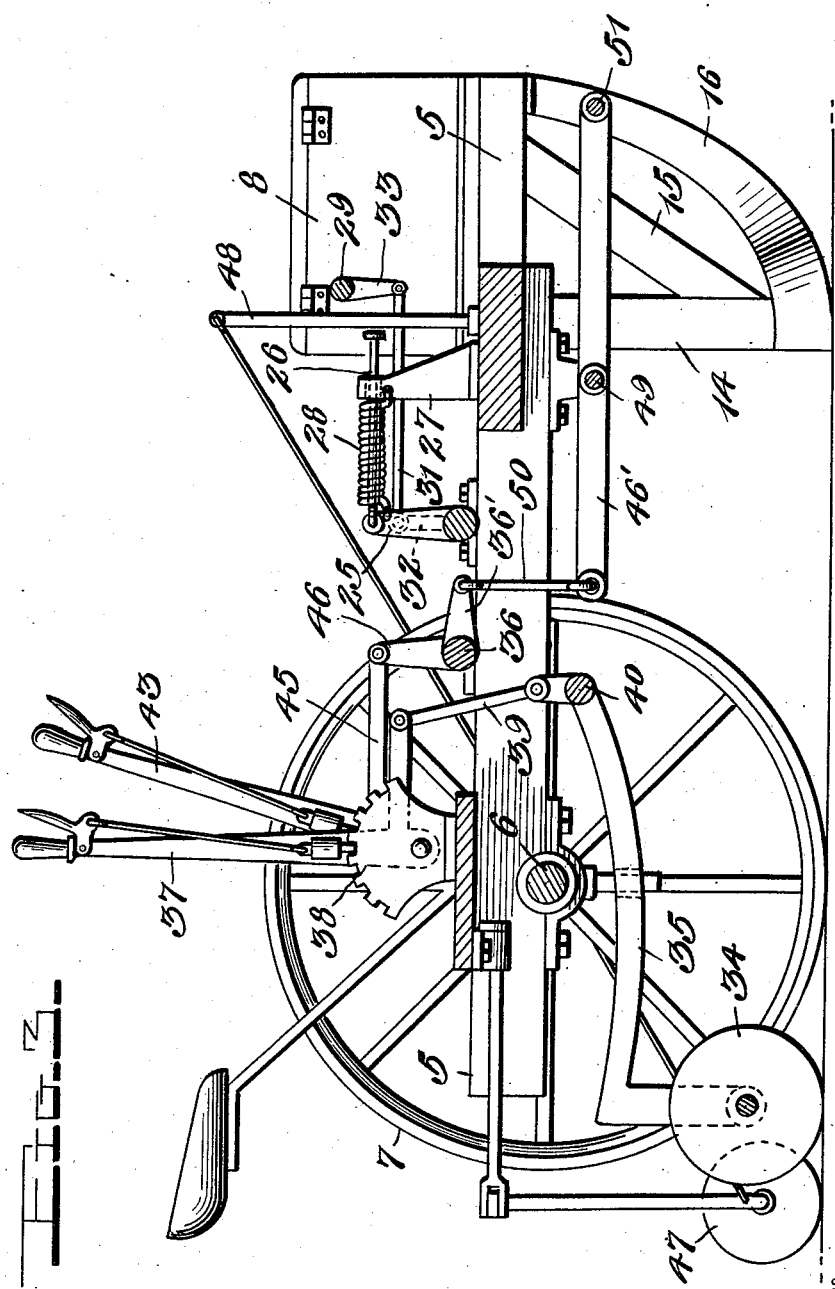

J. H. & L. F. ROBINSON.
COMBINED PLANTER AND FERTILIZER DISTRIBUTER.
APPLICATION FILED SEPT. 7, 1911.
1,019,189.
Patented Mar. 5, 1912.
4 SHEETS—SHEET 4.
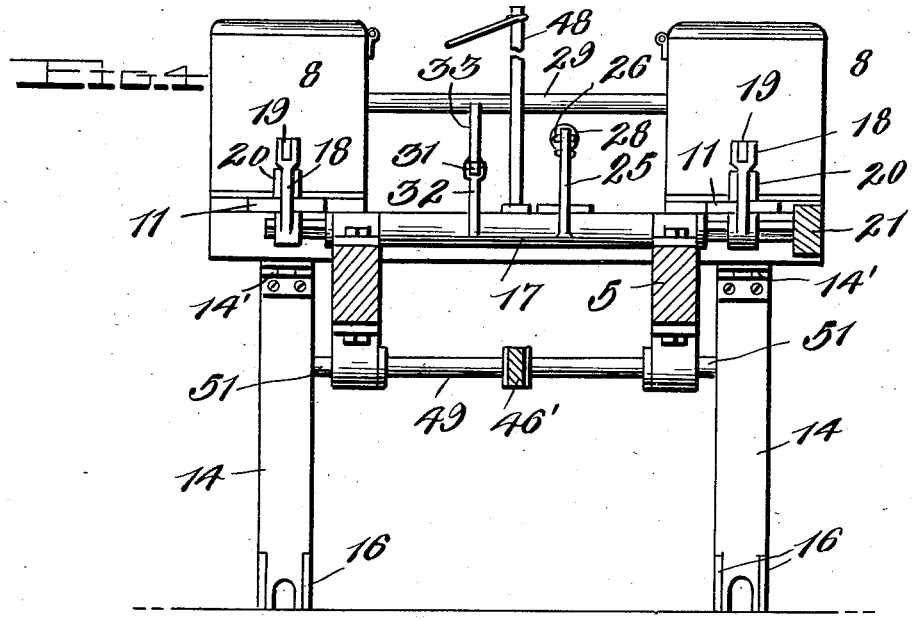
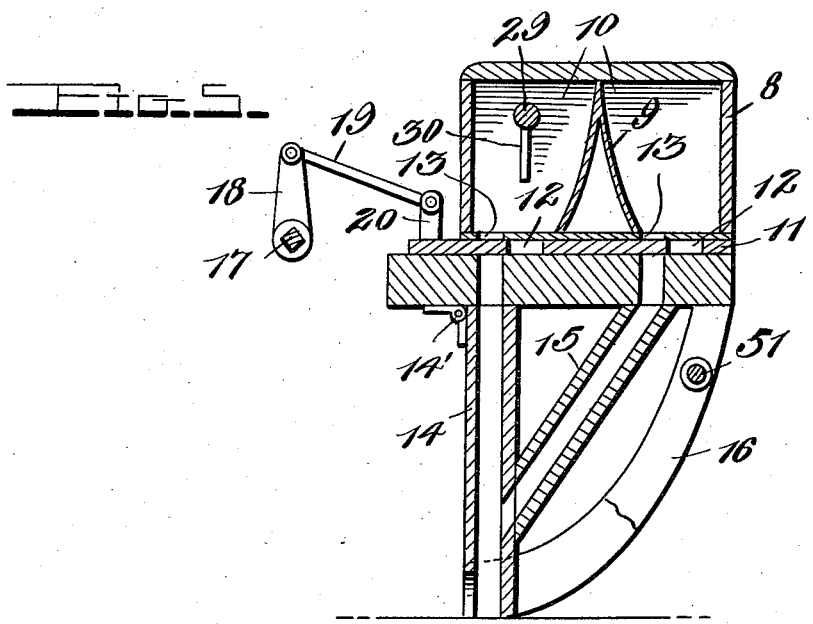
Witnesses
Chas. L. Griesbauer.
G. B. Norton.
Inventors
J. H. Robinson and
L. F. Robinson,
By Watson E. Coleman.
Attorney

UNITED STATES PATENT OFFICE.

JOSEPH HORLIN ROBINSON AND LILLARD FILSON ROBINSON, OF ADAMS, TENNESSEE.

COMBINED PLANTER AND FERTILIZER-DISTRIBUTER.

1,019,189. Specification of Letters Patent. Patented Mar. 5, 1912.

Application filed September 7, 1911. Serial No. 648,026.

*To all whom it may concern:*

Be it known that we, JOSEPH H. ROBINSON and LILLARD F. ROBINSON, citizens of the United States, residing at Adams, in the county of Robertson and State of Tennessee, have invented certain new and useful Improvements in Combined Planters and Fertilizer-Distributers, of which the following is a specification, reference being had to the accompanying drawings.

This invention relates to improvements in combined planters and fertilizer distributers and has for its object to provide a machine of comparatively simple construction whereby the corn or other seed being planted may be dropped in hills and the hills suitably marked or checked.

A further object of the invention is to provide means for facilitating the turning of the machine at the end of a row.

Still another object resides in the provision of novel means for dropping the seed and fertilizer at predetermined intervals into the depositing chutes.
Still another object of the invention is to provide a rear supporting roller arranged between the main supporting wheels of the machine and adapted to support the machine when the same is being turned, and means for raising and lowering said roller.

With the above and other objects in view, the invention consists of the novel features of construction, combination and arrangement of parts hereinafter fully described and claimed, and illustrated in the accompanying drawings, in which—

Figure 1 is a side elevation of a combined planter and fertilizer distributer embodying our improvements; Fig. 2 is a top plan view;
Fig. 3 is a longitudinal section taken on the line 3—3 of Fig. 2; Fig. 4 is a transverse section taken on the line 4—4 of Fig. 2; and Fig. 5 is a detail section taken on the line 5—5 of Fig. 2.
Referring in detail to the drawings 5 designates the main frame of the machine which is mounted at its rear end upon the axle 6. Upon the ends of this axle the supporting wheels 7 are revolubly mounted. The frame 5 extends forwardly of the supporting wheels and upon the same the seed and fertilizer boxes 8 are arranged. These boxes are disposed at opposite sides of the machine and in line with the supporting wheels.
Each of the boxes 8 is divided by a central partition 9 into two separate compartments 10. The forward compartments are adapted to contain the corn or other seed to be planted while in the rear compartments a suitable fertilizing material is contained. The slidable seed dropping plates 11 are arranged between the boxes 8 and the frame upon which they are mounted, said plates being provided with the openings 12 to register with openings 13 in the bottom of the seed and fertilizer compartments. Directly beneath these compartments the chutes 14 and 15 are arranged, the chute 14 receiving the fertilizer and being secured at its lower end to the ground opening shoes 16. The upper end of the chute 14 is hingedly secured to the frame as indicated at 14'. The other chute 15 which receives the seed is disposed at an angle and communicates at its lower end with the chute 14. At this point the seed and the fertilizer are mixed and are then deposited in the furrow opened by the shoe. The seed dropping plates 11 are adapted to be reciprocated beneath the boxes and are actuated in the following manner. In the frame 5 immediately in the rear of the boxes 8, a transverse shaft 17 is mounted to oscillate. Upon this shaft the arms 18 are rigidly fixed and links 19 connect said arms at their free ends to the lugs 20 on the ends of the plates 11. One end of the shaft 17 is extended beyond the side of the frame and has secured thereto a block 21. A finger 22 is pivoted upon this block and is adapted to be engaged by a series of pins 23 projecting from the outer face of one of the supporting wheels 7. This finger has pivotal movement in only one direction, and is yieldingly held against such movement by means of the leaf spring 24. It will thus be seen that in the backward movement of the machine, the engagement of the pins 23 with the finger will not oscillate the shaft 17. In the forward movement of the machine, however, the pins strike said finger and force the block 21 downwardly thereby oscillating or rocking the shaft 17. This oscillation of the shaft moves the seed dropping plates rearwardly through the medium of the connections above described until the openings in said plates register with the openings in the bottom of the seed and fertilizer compartments so that the seed and fertilizer is dropped into the rear end of the shoes 16. To the shaft 17 an arm 25 is secured to which one end of a rod 26 is connected, the other end of said rod being loosely disposed in a suitable support 27 arranged upon the machine frame. A coiled spring 28 is arranged on said rod and is secured at its ends to the arm and the support. It will thus be seen that when the shaft is rocked this spring is placed under tension and when the pin on the wheel is disengaged from the finger 22, said spring immediately returns the shaft 17 to its normal position and forces the seed dropping plates 11 forwardly thereby cutting off the feed of the seed and fertilizer.

In order to insure the proper feed of the fertilizer and prevent the same from sticking to the walls of the compartments 10, we provide the transversely disposed shaft 29 which is mounted in the walls of said boxes and is provided at its ends with the agitating fingers 30 which engage the fertilizer and break up the same so that it will flow freely through the openings in the bottom of the compartments. This shaft is rotated through the medium of a link 31 which connects the arm 32 fixed to the shaft 17 with a crank arm 33 on the shaft 29. Thus the agitator is actuated simultaneously with the sliding movement of the seed dropping plate so that the proper feed of the material is positively assured.

In order to facilitate the turning movement of the machine at the end of a row, we provide the roller 34 which is arranged between the supporting wheels 7 and rearwardly of the axle 6. This roller is rotatably mounted in a frame 35 which is journaled intermediate of its ends upon supports arranged beneath the wheel axle 6. A lever 37 carries the usual spring actuated dog for engagement with the teeth of a rack 38 to hold said lever in its adjusted position, and this lever is connected by means of a link 39 to the cross bar 40 in the forward end of the frame 35. It will thus be seen that by manipulating the lever 37, the cross bar 40 is raised or lowered and the frame 35 oscillated upon its fulcrum to raise and lower the supporting roller 34. Upon the frame 5 a second lever 43 is mounted together with its rack 44 and is connected by means of a link 45 to an upright arm 46 fixed to the transverse shaft 36 mounted upon the main frame 5. A bar 46' is longitudinally disposed beneath the platform upon which the seed and fertilizer boxes are mounted and is pivoted intermediate of its ends upon a rod 49 fixed in the frame for oscillatory movement. A rod 50 connects the rear end of this bar to a stud 36' which is fixed to the transverse shaft 36. A rod 51 connects the furrow opening shoes 16 and extends through the forward end of the longitudinally disposed bar 46'. The spouts 14 are hingedly secured at their upper ends to the under side of the frame 5 which is provided with suitable openings to receive the fertilizer. By adjusting the lever 43, the furrow opening shoes may be elevated out of contact with the ground. By means of this arrangement of parts, it will be readily seen that the machine may be easily and quickly turned upon arriving at the end of a row by lowering the roller 34 until the supporting wheels 7 are lifted out of contact with the ground. The shoes 16 are then elevated and owing to the fact that the roller 34 is centrally disposed, and has very little ground engaging surface, the resistance offered to the turning movement of the machine is comparatively small. After the machine has been turned, the roller is elevated and the shoes lowered to their operative positions.

A suitable marker 47 is arranged upon an arm extending laterally from the rear end of the machine and provides a suitable guide line so that the seed hills may be deposited in parallel rows.

The rims or treads of the ground wheels 7 are of concave-convex form in cross section and form the ridge or hill over the seed as it is dropped. This wheel rim is provided with a plurality of openings 52 and the distance between adjacent openings is equivalent to the distance between the said hills so that each hill is plainly marked by a small mound or hillock of earth which enters these openings. In this manner the hills are properly checked.

From the foregoing it is thought that the construction and operation of our improved machine will be readily understood. There are comparatively few elements employed in the construction so that the machine as a whole will be extremely durable and require only small and infrequent repairs. It will of course be understood that the machine is as well adapted for planting seed in drills and either with or without the fertilizer. While the machine is primarily designed for the planting of corn, it will be understood that the invention is not restricted to such use as it may also be employed for the planting of other grain seed, tobacco and similar agricultural products. The machine is also susceptible of considerable modification in the form and construction of the various elements without departing from the essential feature or sacrificing any of the advantages thereof.

Having thus described the invention what is claimed is:—

1. The combination with a wheel supported frame, of seed and fertilizer hoppers rigidly mounted upon opposite ends of said frame, seed and fertilizer receiving spouts arranged beneath the frame, the seed receiving spout being hingedly secured at its upper end to said frame, and means mounted upon said frame to swing said depositing spouts to an inoperative position beneath the hoppers.

2. The combination with a wheel supported frame, of combined seed and fertilizer hoppers rigidly mounted upon said frame, seed receiving spouts hingedly secured at their upper ends to the frame, fertilizer receiving spouts carried by the seed receiving spouts and communicating with the same adjacent their lower ends, furrow opening shoes rigidly fixed to the seed receiving spouts at their lower ends, a cross bar connecting said shoes, and operating means mounted upon the frame and connected to said cross bar whereby said seed and fertilizer receiving spouts and the shoes may be swung beneath the frame to their operative or inoperative positions.

In testimony whereof we hereunto affix our signatures in the presence of two witnesses.

JOSEPH HORLIN ROBINSON.
LILLARD FILSON ROBINSON.

Witnesses:
B. M. STOLTZ,
J. T. DICKERSON.

Copies of this patent may be obtained for five cents each, by addressing the "Commissioner of Patents, Washington, D. C."